United States Patent Office 3,356,534
Patented Dec. 5, 1967

3,356,534
PRODUCTION OF ELECTRODES FOR ALKALINE STORAGE BATTERIES WHEREIN ACTIVE MATERIAL IS AT LEAST PARTIALLY FORMED FROM THE METALS IN SAID GRID
Karl Ackermann, Mannheim, Germany, assignor, by mesne assignments, to Societe des Accumulateurs Fixes et de Traction (Societe Anonyme), Romainville, Seine, France, a French company
No Drawing. Continuation of application Ser. No. 281,361, May 17, 1963. This application Oct. 12, 1966, Ser. No. 586,307
Claims priority, application Germany, May 26, 1962, B 67,427
9 Claims. (Cl. 136—6)

ABSTRACT OF THE DISCLOSURE

A process for producing electrodes for alkaline storage batteries in which the metal of the grid itself is used in the formation of the active material. A solution containing a weak acid and a metal salt having an oxidizing anion is placed in contact with the grid. This activates the grid whereupon the grid is treated with an aqueous alkali metal hydroxide solution. The process provides a simple means for producing electrodes of this type.

---

This application is a continuation of application Ser. No. 281,361, filed May 17, 1963, now abandoned.

This invention relates to a process for the production of electrodes for alkaline storage batteries, especially to electrodes consisting of electrochemically inactive grids the pores of which contain the active material.

It is known that efficient positive electrodes for alkaline storage batteries can be prepared by introducing nickel hydroxide or mixtures of nickel and cobalt hydroxides as an active composition into the pores of porous electrode grids, made for example of metallic nickel. According to the process of British patent specification No. 331,540 this may be effected by impregnating the electrode grid with a solution of a nickel salt, for example concentrated nickel nitrate solution, if desired drying the impregnated electrode grid and then precipitating the nickel salt as nickel hydroxide in the pores by treatment with an alkaline solution, the electrode then being washed and dried. The nickel nitrate solution introduced into the pores by impregnation may also exert an oxidizing action on the skeleton so that in this way part of the active composition is formed from the electrode grid itself. In this process it is necessary in every case to repeat the said operations, i.e. impregnation, precipitation, washing and drying, several times in order to achieve an adequate capacity for the electrodes. According to the process described in British patent specification No. 487,607 nickel hydroxide is precipitated from the nickel nitrate solution in the pores of the electrode grid by cathodic polarization. In this process also, however, repetition of the impregnation and polarization processes is indispensable for the achievement of adequate capacity.

It is an object of the present invention to provide a simpler method for the production of the said type electrodes. It is a further object of the present invention to provide a process for the production of the said electrodes in which the metal of the electrode grid itself can be utilized for the formation of the active material, i.e. it is unnecessary in the case of the positive electrode to supply nickel nitrate solution from outside. These and other objects and advantages of the invention are achieved when a solution containing at least one weak acid and a metal salt having an oxidizing anion is allowed to act on an at least partly metallic electrode grid which is inactive with respect to the electrolyte and the electrode grid is then treated with an aqueous solution of an alkali metal hydroxide.

In addition to nitrates, persulfates are particularly suitable as anions having an oxidizing action.

With the activation of the electrode grid according to the present invention, a capacity which can only be achieved by prior art methods by repeating the process several times, is achieved with only a single impregnation followed by treatment with an aqueous solution of an alkali metal hydroxide. When using metal nitrates for the impregnation of the electrode grid, less aqueous alkali metal hydroxide solution is used in the subsequent alkaline treatment than in the prior art methods. The treatment according to the invention may be repeated to increase the capacity, if desired after a short rinsing of the electrode with water, and in contrast to the prior art methods an alkaline treatment of the electrode grid after the first impregnation may if desired be omitted.

The solution used for the impregnation of the electrode is advantageously prepared by dissolving a metal nitrate, for example nickel nitrate, in an aqueous solution of a weak acid, for example acetic acid, propionic acid, citric acid or derivatives of the said acids, e.g. glycocoll. Salts of the weak acid used may also be added to the solution. The concentration of the acid used may be varied within wide limits. An activating influence is noticeable even with a 10% aqueous solution of the acid. It is advantageous to use an aqueous solution which contains the acid in an amount of 15 to 50% by weight.

The favorable effect of a weak acid on the activation of an electrode grid is not limited to nickel nitrate but extends also to other nitrates, for example cobalt nitrate. Even solutions of nitrates which by themselves have only quite an insignificant activating effect or which behave entirely indifferently to porous nickel grids, such as the nitrates of the alkali metals or other strongly basic metals and mixtures of these nitrates with nickel or cobalt salts, e.g. sulfates, have a strong activating effect after a weak acid has been added thereto. When the activating solution contains metal salts which form insoluble hydroxides in alkaline solutions, in addition to nickel salts, the hydroxides of these metals are also precipitated in the pores by treatment of the electrodes.

Electrode grids impregnated according to this invention are exposed, prior to treatment with aqueous alkali hydroxide solution, to the action of the impregnating solution for a certain period which depends substantially on the desired capacity and the temperature at which the treatment is carried out. It is advantageous to use elevated temperatures, for example temperatures of more than 50° C., because this accelerates the formation of the active composition. It is of advantage to work at temperatures of about 70° to 80° C. In general it is sufficient to carry out the treatment for one to two hours but this period may be shortened or lengthened depending on the conditions chosen and the capacity required. It is further advantageous to perform the activation of the grid which has been impregnated with the acid solution in an atmosphere saturated with water vapor.

By the process according to this invention it is possible not only to produce the active composition by activation of the electrode grid itself, but at the same time to introduce a considerable proportion of the active composition into the electrode grid from outside, for example by the use of nickel nitrate solutions. This is important because parallel with the formation of the active composition from the electrode grid, weakening of the mechanical strength of the grid takes place. Depending on the use to which the electrodes prepared are to be put it is possible by variation of the concentrations of the solution used and of their period of action on the grid, either to form more active composition from the nitrate solution introduced into the grid from outside, so that more mechanically stable grids are obtained, or to increase the proportion of active composition which is formed by activation of the electrode grid, in which case a decrease in the mechanical stability of the electrodes must be taken into account.

The following example will further illustrate the invention.

*Example*

A porous nickel sintered plate weighing 4.26 g. and having the dimensions 76 x 28 x 0.90 mm., which is reinforced by a thin perforated sheet of nickel embedded therein during sintering, is immersed in a solution containing 2 parts of crystallized nickel nitrate in 1 part of 30% by weight acetic acid and then treated for about two hours at a temperature of about 80° C. in an atmosphere saturated with water vapor. Then the plate is placed for half an hour in hot 20% caustic potash solution and thereafter rinsed thoroughly with water and dried. After repeating this treatment, the nickel sintered plate has increased in weight by 1.4 g. Of this increase in weight, 0.65 g. is accounted for by the nickel hydroxide formed from the nickel nitrate introduced from outside with the activating solution and 0.75 g. is due to the formation of nickel hydroxide by oxidation of the nickel sintered grid itself. When used as an electrode, the plate has a capacity of 0.75 ampere hours, this being about the value to be expected theoretically.

What I claim is:

1. A process for producing electrodes for alkaline storage batteries comprising the steps of treating an at least partly metallic porous electrode grid which is inactive to electrolytes with an aqueous solution consisting essentially of at least one weak acid dissolved in water, said acid being a member selected from the group consisting of acetic acid, propionic acid, citric acid and glycocoll and a metal salt having an oxidizing anion, and subsequently treating said grid with an aqueous solution of an alkali metal hydroxide whereby electrochemically active material consisting of oxidic compounds of the metals contained in said grid are formed within the pores of said grid, said active material being at least partially formed from the metals contained in said grid.

2. A process as in claim 1 wherein the porous electrode grid is made up at least partly of nickel.

3. A process as in claim 2 wherein the metal salt is a nitrate.

4. A process as in claim 2 wherein the metal salt is nickel nitrate.

5. A process as in claim 2 wherein the metal salt is cobalt nitrate.

6. A process as in claim 2 carried out at a temperature of more than 50° C.

7. A process according to claim 2 wherein the treatment of the grid with said aqueous solution consisting essentially of at least one weak acid dissolved in water and a metal salt having an oxidizing anion is carried out in an atmosphere saturated with water vapor.

8. A process as in claim 2 wherein the aqueous solution is prepared by adding a salt of said weak acid and a metal salt having an oxidizing anion to water.

9. A process as in claim 2 wherein said solution contains said aqueous weak acid in the amount of 15 to 50% by weight.

References Cited

UNITED STATES PATENTS

| 2,880,257 | 3/1959 | Murphy et al. | 136—29 |
| 3,041,388 | 6/1962 | Fukuda et al. | 136—24 |
| 3,203,879 | 8/1965 | Mueller | 204—56 |
| 3,269,864 | 8/1966 | Ackermann et al. | 136—78 |

FOREIGN PATENTS 232,193    3/1959    Barak et al.

WINSTON A. DOUGLAS, *Primary Examiner.*

A. SKAPARS, *Assistant Examiner.*

UNITED STATES PATENT OFFICE
CERTIFICATE OF CORRECTION

Patent No. 3,356,534                        December 5, 1967

Karl Ackermann

It is certified that error appears in the above identified patent and that said Letters Patent are hereby corrected as shown below:

Column 4, line 26, after "said" insert -- aqueous --.

Signed and sealed this 16th day of December 1969.

(SEAL)
Attest:

Edward M. Fletcher, Jr.                  WILLIAM E. SCHUYLER, JR.
Attesting Officer                         Commissioner of Patents